United States Patent [19]

Lawrence et al.

[11] 4,072,338
[45] Feb. 7, 1978

[54] OPENABLE DUAL WINDSHIELD ARRANGEMENT FOR CONSTRUCTION VEHICLES

[75] Inventors: Dean M. Lawrence, Aurora; Fred E. Simpson, Oswego, both of Ill.

[73] Assignee: Caterpillar Tractor Co., Peoria, Ill.

[21] Appl. No.: 673,508

[22] Filed: Apr. 5, 1976

[51] Int. Cl.² ............................................. B62D 27/00
[52] U.S. Cl. .................................. 296/28 C; 49/163; 296/89; 296/146
[58] Field of Search ................... 296/146, 28 C, 84 N, 296/89; 49/163, 164, 165; 180/89 A, 89.12

[56] References Cited

U.S. PATENT DOCUMENTS

| 798,447 | 8/1905 | Pfleghar | 296/84 |
| 852,816 | 5/1907 | Benjamin | 296/89 |
| 3,993,346 | 11/1976 | Mounts | 296/84 N |

FOREIGN PATENT DOCUMENTS

| 477,087 | 12/1937 | United Kingdom | 296/84 N |
| 473,810 | 10/1937 | United Kingdom | 296/89 |

Primary Examiner—Joseph F. Peters, Jr.
Assistant Examiner—John A. Carroll

Attorney, Agent, or Firm—Phillips, Moore, Weissenberger, Lempio & Majestic

[57] ABSTRACT

The frame of an operator's cab has a sub-frame pivotally mounted thereon. An upper windshield is fixedly mounted on the sub-frame and a lower windshield is slidably mounted in a co-linear track defined on the main frame and on the sub-frame. A first latch is mounted on the sub-frame to releasably attach the sub-frame and upper windshield in a generally vertical closed position or a generally horizontal open position on the frame of the operator's cab. A second latch is adapted to maintain the lower windshield in one of four positions for permitting sequential upward movement thereof between (1) a lowermost first position to permit the sub-frame and upper windshield to be pivoted into the operator's cab, (2) a second position to prevent the sub-frame and upper windshield from pivoting into the operator's cab, (3) a third position to define an opening between a lower edge of the lower windshield and the main frame for ventilation purposes, and (4) a fourth position substantially overlying the upper windshield to permit the sub-frame and upper and lower windshields to pivot into the operator's cab as a unit simultaneously.

11 Claims, 7 Drawing Figures

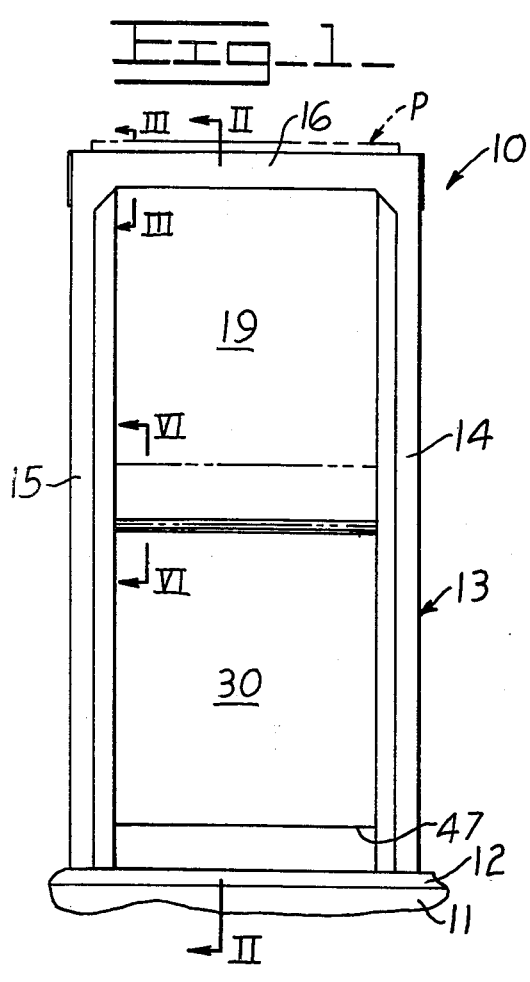
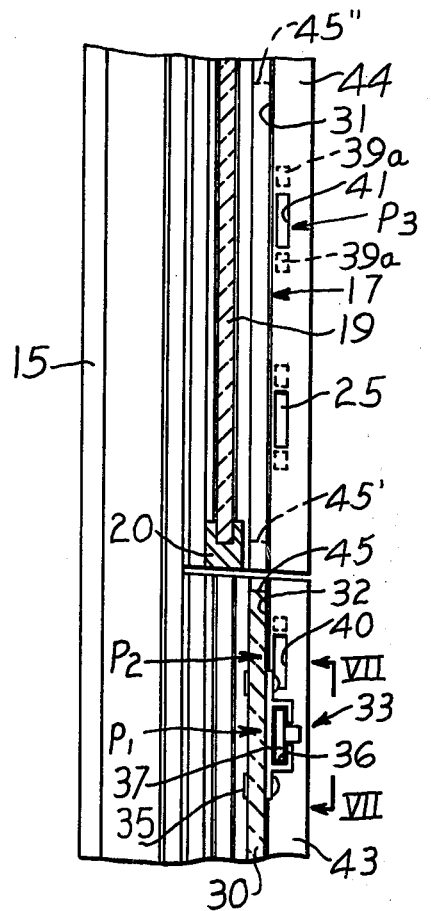
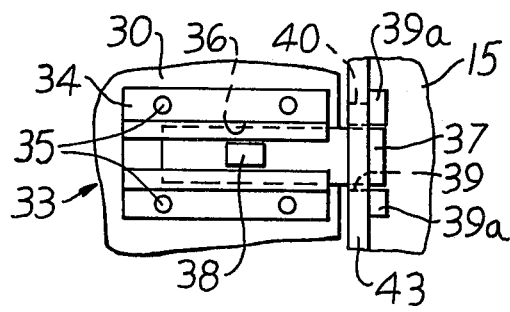

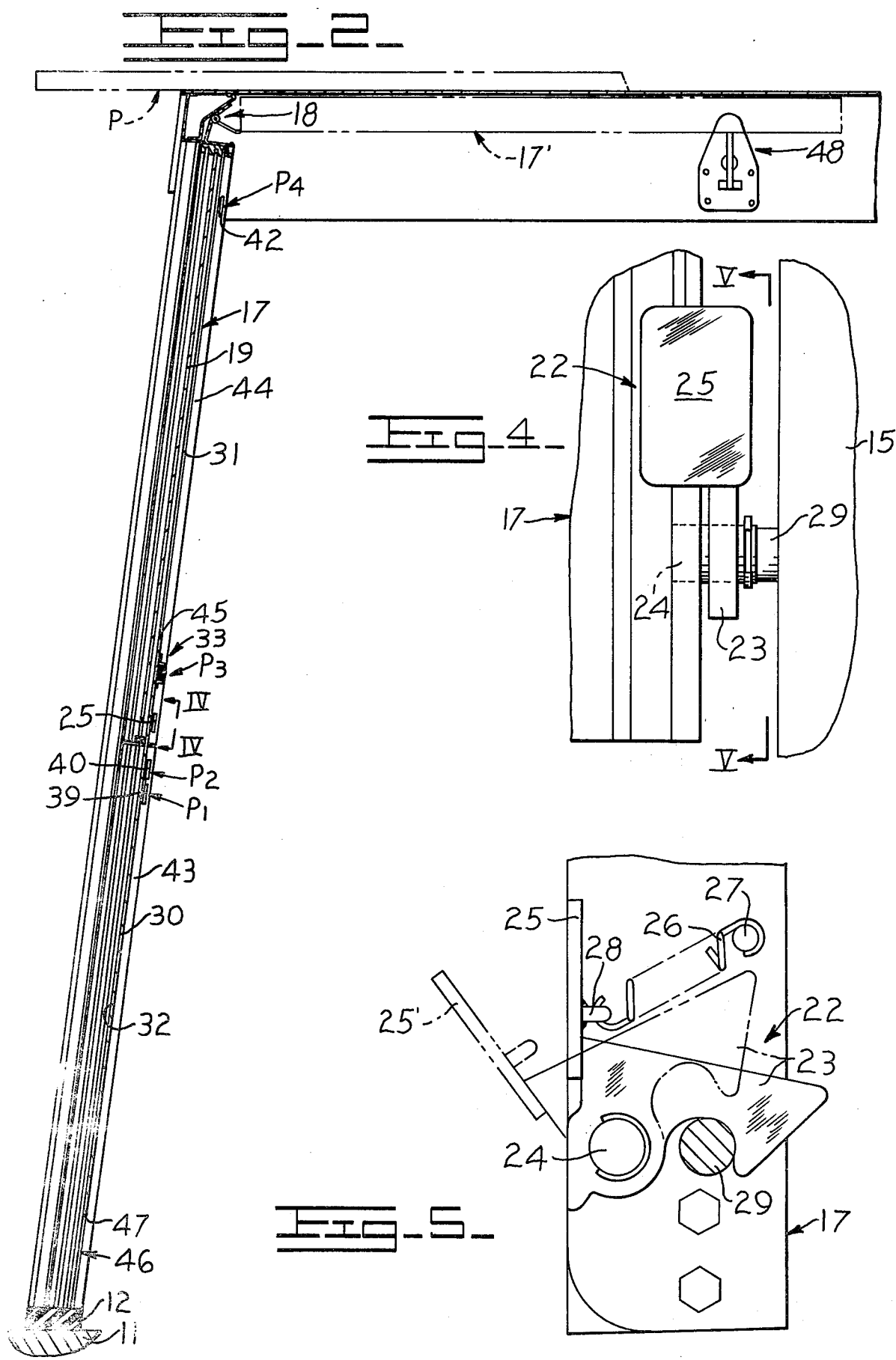

OPENABLE DUAL WINDSHIELD ARRANGEMENT FOR CONSTRUCTION VEHICLES

BACKGROUND OF THE INVENTION

This invention relates to a dual window arrangement particularly useful on the operator's cab of a construction vehicle, such as an excavator. Many such arrangements comprise a pair of upper and lower windshields fixedly mounted on the frame of the operator's cab to provide the operator with unobstructed visibility fowardly of the vehicle and to provide him with environmental protection. It has proven desirable in certain instances to movably mount at least one of the windshields on the frame of the operator's cab for ventilation and/or increased visibility purposes.

In window arrangements wherein a one-piece windshield is slidably mounted on a frame, the windshield projects forwardly of the frame when raised to a horizontally disposed open position. Such projection of the windshield requires a somewhat complex guard assembly mounted on the front of the operator's cab which projects forwardly therefrom in covering relationship relative to the windshield.

SUMMARY OF THIS INVENTION

An object of this invention is to provide an improved dual windshield arrangement of the above type adapted to permit opening of an upper windshield, opening of a lower windshield or simultaneous opening of the upper and lower windshields. The upper windshield is preferably fixedly mounted on a sub-frame having its upper end pivotally mounted on the main frame whereas the lower windshield is preferably slidably mounted in an aligned track defined on the main frame and on the sub-frame.

In the preferred embodiment of this invention, the lower windshield is adapted for sequential upward movement between (1) a lowermost first position in non-overlapping relationship relative to the upper windshield to permit the sub-frame and upper windshield to pivot inwardly into the operator's cab, (2) a second position partially overlapping the upper windshield to prevent such pivoting of the sub-frame and the upper windshield; (3) a third position further overlapping the upper windshield to define an opening between a lower edge of the lower windshield and the main frame for ventilation purposes, and (4) an uppermost fourth position substantially overlying the upper windshield to permit the sub-frame and the upper and lower windshields to pivot inwardly into the operator's cab as a unit simultaneously.

The openable dual windshield arrangement of this invention is thus adapted to provide a high degree of environmental protection and increased visibility and ventilation capabilities over conventional dual windshield arrangements. In addition, the windshield arrangement of this invention eliminates the need for the type of above-described guard assembly required for one-piece windshields which project forwardly of the operator's cab when the windshield is opened. In particular, the subject windshield arrangement maintains the upper and lower windshields entirely within the protected confines of the operator's cab in each of the above-described positions (1) through (4). Thus, on a relatively non-complex (e.g., flat grate-like) structure P (FIGS. 1-3) need be mounted on the operator's cab for protection against falling objects.

BRIEF DESCRIPTION OF THE DRAWINGS

Other objects of this invention will become apparent from the following description and accompanying drawings wherein:

FIG. 1 is a front elevational view partially illustrating an operator's cab for a construction vehicle, having an openable dual windshield arrangement embodiment of this invention mounted thereon;

FIG. 2 is an enlarged sectional view of the cab, taken in the direction of arrows II—II in FIG. 1;

FIG. 3 is an enlarged sectional view, taken in the direction of arrows III—III in FIG. 1, but showing a lower windshield in its raised position;

FIG. 4 is an enlarged rear elevational view, taken in the direction of arrows IV—IV in FIG. 2, illustrating a first latch means employed in the dual window arrangement;

FIG. 5 is a side elevational view of the first latch means, taken in the direction of arrows V—V in FIG. 4;

FIG. 6 is an enlarged side elevational view taken in the direction of arrows VI—VI in FIG. 1 but illustrating a lower windshield in a lowered position; and FIG. 7 is a rear elevational view, taken in the direction of arrows VII—VII in FIG. 6, illustrating a second latch means employed in the window arrangement.

DETAILED DESCRIPTION

FIG. 1 illustrates an operator's cab 10 suitably mounted on a frame 11 of a construction vehicle, such as an excavator. If so desired, a suitably constructed and arranged elastomeric sealing gasket 12, such as foam rubber, can be mounted between the operator's cab and frame 11 for sealing and vibration damping purposes. It should be understood that although the hereinafter described dual windshield arrangement of this invention is particularly adapted for use on the operator's cab of a construction vehicle, that other uses thereof will become obvious to those skilled in the art in view of the following detailed description.

Referring to FIGS. 1-3, the operator's cab comprises a front panel including a rectangular frame 13 having a pair of generally vertically disposed and parallel side rails 14 and 15 and a horizontally disposed cross-rail 16 secured between upper ends thereof. The dual windshield arrangement of this invention comprises a sub-frame 17 having its upper end pivotally mounted on cross-rail 16 of the main frame by a pivot means or hinge connection 18. As shown in FIGS. 2 and 3, the sub-frame is thus adapted to be pivoted from its normal generally vertically disposed open position to a generally horizontally disposed open position 17'.

The dual windshield arrangement further comprises an upper windshield 19 having a U-channel 20 secured on each edge thereof. The channels and the upper windshield are fixedly mounted in accommodating channels 21, secured on sub-frame 17 to form an integral part thereof. As shown on FIGS. 4 and 5, a first latch means 22 releasably attaches sub-frame 17 to each side rail 14 and 15 of the main frame for the operator's cab.

Each latch means (one shown) preferably comprises a latch member 23 pivotally mounted on a pin 24 secured to sub-frame 17. A plate 25 is secured to the latch member and exposed interiorly of the operator's cab to adapt it for manipulation between its solid line position 25 and phantom line position 25' in FIG. 5. A tension coil spring or spring means 26 has one end anchored to a pin 27, secured to sub-frame 17, and its other end anchored to an eyelet 28, secured to a backside of plate 25 to normally bias the latch member into latched engagement with a pin 29 secured to side rail 15.

Referring to FIGS. 2, 3 and 6, the lower windshield 30 of the dual windshield arrangement is slidably mounted on the operator's cab to be moved between four different positions, hereinafter more fully described. The second windshield is frameless and is adapted to slide in a pair of track means, disposed on either side of the lower windshield. In particular, each track means (one shown) comprises an upper track 31 suitably defined in a channel bar secured within sub-frame 17 and a lower track 32 suitably defined in a channel bar secured within side rail 15 to thus normally dispose tracks 31 and 32 in co-linear relationship when upper window 19 is in its closed position illustrated.

FIGS. 6 and 7 illustrate a second latch means 33 for releasably attaching the lower windshield in one of four selected positions $P_1$ through $P_4$ (FIGS. 2 and 6). Such latch means preferably comprises a bracket 34 secured directly on windshield 30 by bolts 35. The bracket defines an elongated slot 36 which reciprocally mounts a lock bar 37 therein. The lock bar has a finger-engaging lug 38 secured thereon to project outwardly from the bracket to facilitate alternate reciprocation of the lock bar into one of four slots 39, 40, 41 and 42, each of which is straddled by a pair of wear blocks 39a (FIGS. 6 and 7). Lower two slots 39 and 40 are formed in a flange 43, secured within side rail 15, whereas upper two slots 41 and 42 are formed in a flange 44, secured to sub-frame 17.

Referring to FIGS. 2 and 6, lower windshield 30 is thus adapted for sliding movements upwardly between four positions, namely: (1) a lowermost first position $P_1$ (FIGS. 6 and 7) wherein lock bar 37 engages slot 39 to position an upper edge 45 of the lower windshield in non-overlapping relationship relative to the upper windshield for permitting the upper windshield and sub-frame to pivot inwardly into the operator's cab, (2) a second position $P_2$ wherein lock bar 37 engages slot 40 to position upper edge 45 of the lower windshield at its phantom-line position 45' in FIG. 6 in partial overlapping relationship relative to the upper windshield for preventing the sub-frame and upper windshield from pivoting into the operator's cab, (3) a third position $P_3$ (FIG. 2) wherein lock bar 37 engages slot 41 to position upper edge 45 of the lower windshield at its phantom-line position 45" (FIG. 6) in further overlapping relationship relative to the upper windshield to define an opening 46 between a lower edge 47 of the lower windshield and the main frame, and (4) an uppermost fourth position $P_4$ (FIG. 3) wherein lock bar 37 engages slot 42 whereby the lower windshield substantially overlies the upper windshield for permitting the sub-frame and the upper and lower windshields to pivot inwardly into the operator's cab as a unit simultaneously, as indicated by the phantom-line position 17' of sub-frame in FIGS. 2 and 3.

In the latter position, wherein both windshields are open, a spring-loaded latch mechanism 48 mounted on the top panel of the operator's cab will engage an edge of the sub-frame to hold it at position 17'. Such latch mechanism may be of the type disclosed in U.S. patent application Ser. No. 706,709, filed on July 19, 1976 by Dean M. Lawrence for "Latch Assembly." The latter application is assigned to the assignee of the subject application.

It should be noted that when the lower windshield is held at either position $P_1$ or $P_2$ by latch means 33, that gasket 12 is sufficiently resilient to expand and compress into sealing contact with lower edge 47 of windshield 30. Movement of the lower windshield to position $P_3$ will provide opening 46 to induce a circulation of air in the operator's cab for ventilation purposes. Raising of the lower windshield to position $P_4$ will permit the above-described simultaneous opening of the upper and lower windshields whereby the operator's visibility forwardly of the vehicle is increased.

As suggested above, the windshield arrangement of this invention is adapted to be used in combination with a relatively non-complex protective structure P, (FIGS. 1-3). For example, the protective structure may comprise a flat grate-like structure mounted on the operator's cab to project forwardly therefrom to cover the windshields. Such a structure is fully disclosed in U.S. patent application Ser. No. 689,284, filed on May 24, 1976 by Dean M. Lawrence and Gary L. Popdan for "Falling Object Protective Structure." The latter application is assigned to the assignee of the subject application.

I claim:

1. A dual windshield arrangement, mounted on a main frame of an operator's cab, comprising
   a sub-frame having an upper end thereof pivotally mounted in a fixed position on said main frame solely for swinging movements between closed and opened positions,
   an upper windshield mounted on said sub-frame,
   a lower windshield slidably mounted on said main frame and on said sub-frame for sliding movements below or in overlying relationship relative to said upper windshield whereby said upper windshield can be solely opened, said lower windshield can be solely opened or said upper and lower windshields can be opened simultaneously,
   first latch means releasably attaching said sub-frame to said main frame, and
   second latch means releasably attaching said lower windshield in a selected position on one of said main frame and said sub-frame.

2. The dual windshield arrangement of claim 1 wherein said lower windshield is slidably mounted in a track means defined in normal co-linear relationship on said main frame and on said sub-frame when said sub-frame and upper windshield are maintained in a normally closed position on said main frame for permitting sequential upward movement of said lower windshield between (1) a lowermost first position maintaining said lower windshield in non-overlapping relationship relative to said upper windshield for permitting pivoting of said sub-frame and said upper windshield inwardly into said operator's cab, (2) a second position maintaining said lower windshield in partial overlapping relationship relative to said upper windshield for preventing said sub-frame and said upper windshield from pivoting inwardly into said operator's cab, (3) a third position maintaining said lower windshield in further overlapping relationship relative to said upper windshield for defining an opening between a lower edge of said lower windshield and said main frame, and (4) an uppermost fourth position maintaining said lower windshield in substantial overlying relationship relative to said upper windshield for permitting said sub-frame and said upper and lower windshields to pivot inwardly into said operator's unit.

3. The dual windshield arrangement of claim 2 further comprising first latch means for releasably attaching said sub-frame to said main frame and second latch means for attaching said lower windshield in one of said positions (1) through (4).

4. The dual windshield arrangement of claim 1 wherein said upper windshield is secured in place on said sub-frame.

5. The dual windshield arrangement of claim 1 wherein said first latch means comprises a latch member pivotally mounted on said sub-frame and a pin secured on a side rail of said main frame and normally engaged with said latch member when said sub-frame and said upper windshield are maintained in their normally closed position on said operator's cab.

6. The dual windshield arrangement of claim 5 wherein said first latch means further comprises spring means normally biasing said latch member into latched engagement with said pin.

7. The dual windshield arrangement of claim 1 wherein said second latch means comprises a mounting plate secured to said lower windshield, a lock bar reciprocally mounted on said mounting plate and a plurality of slots defined on each of said main frame and said sub-frame to alternately receive an end of said lock bar therein.

8. The dual windshield arrangement of claim 1 further comprising an elastomeric sealing gasket mounted between said windshield arrangement and said main frame to normally contact a lower edge of said lower windshield in sealing contact therewith.

9. The dual window arrangement of claim 1 further comprising a flat protective structure secured on said operator's cab to project forwardly therefrom in covering relationship relative to said upper and lower windshields.

10. A dual windshield arrangement, mounted on a main frame of an operator's cab, comprising
   a sub-frame having an upper end thereof pivotally mounted in a fixed position on said main frame solely for swinging movements between closed and opened positions,
   an upper windshield mounted on said sub-frame, and
   a lower windshield slidably mounted on said main frame and on said sub-frame for sliding movements below or in overlying relationship relative to said upper windshield whereby said upper windshield can be solely opened, said lower windshield can be solely opened or said upper and lower windshields can be opened simultaneously, said lower windshield being slidably mounted in a track means defined in normal co-linear relationship on said main frame and on said sub-frame when said sub-frame and upper windshield are maintained in a normally closed position on said main frame for permitting sequential upward movement of said lower windshield between (1) a lowermost first position maintaining said lower windshield in non-overlapping relationship relative to said upper windshield for permitting pivoting of said sub-frame and said upper windshield inwardly into said operator's cab, (2) a second position maintaining said lower windshield in partial overlapping relationship relative to said upper windshield for preventing said sub-frame and said upper windshield from pivoting inwardly into said operator's cab, (3) a third position maintaining said lower windshield in further overlapping relationship relative to said upper windshield for defining an opening between a lower edge of said lower windshield and said main frame, and (4) an uppermost fourth position maintaining said lower windshield in substantial overlying relationship relative to said upper windshield for permitting said sub-frame and said upper and lower windshields to pivot inwardly into said operator's unit.

11. A dual windshield arrangement, mounted on a main frame of an operator's cab, comprising
   a sub-frame having an upper end thereof pivotally mounted in a fixed position on said main frame solely for swinging movements between closed and opened positions,
   an upper windshield mounted on said sub-frame,
   a lower windshield slidably mounted on said main frame and on said sub-frame for sliding movements below or in overlying relationship relative to said upper windshield whereby said upper windshield can be solely opened, said lower windshield can be solely opened or said upper and lower windshields can be opened simultaneously, and
   latch means releasably attaching said sub-frame to said main frame comprising a latch member pivotally mounted on said sub-frame, a pin secured on a side rail of said main frame and normally engaged with said latch member when said sub-frame and said upper windshield are maintained in their normally closed position on said operator's cab and spring means normally biasing said latch member into latched engagement with said pin.

* * * * *